(12) United States Patent
Hegemier et al.

(10) Patent No.: US 8,021,732 B2
(45) Date of Patent: *Sep. 20, 2011

(54) FISHING LURES AND ADHESIVE COVERS FOR SAME

(75) Inventors: Darrin G. Hegemier, Del Mar, CA (US); Darryl R. Kuhn, La Jolla, CA (US); Paul A. Buss, San Diego, CA (US)

(73) Assignee: Skinit, Inc., San Diego, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/759,600

(22) Filed: Jun. 7, 2007

(65) Prior Publication Data

US 2008/0104880 A1 May 8, 2008

Related U.S. Application Data

(63) Continuation-in-part of application No. 11/726,960, filed on Mar. 23, 2007.

(60) Provisional application No. 60/856,495, filed on Nov. 3, 2006.

(51) Int. Cl.
*B32B 33/00* (2006.01)
*B32B 9/00* (2006.01)
(52) U.S. Cl. ............... 428/40.1; 428/42.1
(58) Field of Classification Search .......... 428/40.1, 428/42.1; 40/638
See application file for complete search history.

(56) References Cited

U.S. PATENT DOCUMENTS

| | | | |
|---|---|---|---|
| 2,767,495 A | 10/1956 | Harris | |
| 4,314,813 A | 2/1982 | Masaki | |
| 4,901,852 A | 2/1990 | King | |
| 4,986,496 A | 1/1991 | Marentic et al. | |
| 5,001,002 A | 3/1991 | Gribbin et al. | |
| 5,045,386 A | 9/1991 | Stan et al. | |
| 5,338,396 A | 8/1994 | Abdala et al. | |
| 5,342,995 A | 8/1994 | Comerci et al. | |
| 5,372,589 A | 12/1994 | Davis | |
| 5,484,560 A | 1/1996 | Moriyama et al. | |
| 5,508,084 A | 4/1996 | Reeves et al. | |
| 5,728,440 A * | 3/1998 | Good | 428/40.1 |
| 5,747,148 A | 5/1998 | Warner et al. | |
| 5,858,494 A * | 1/1999 | Cherkas et al. | 428/40.1 |

(Continued)

FOREIGN PATENT DOCUMENTS

FR      2 847 777 A1      6/2004

(Continued)

OTHER PUBLICATIONS

International Search Report and Written Opinion for PCT/US07/83673, mailed Mar. 12, 2008, 7 pages.

(Continued)

*Primary Examiner* — Patricia L Nordmeyer

(74) *Attorney, Agent, or Firm* — Fitch Even Tabin & Flannery

(57) ABSTRACT

Customizable adhesive covers for fishing lures are provided. In one implementation, an adhesive cover includes a top laminate layer adhered to a base layer that is adhered to a bottom adhesive layer. The base layer is treated to facilitate acceptance of a personalized design applied to the middle layer. The adhesive cover is contoured to partially or completely cover one or more sides of a fishing lure.

20 Claims, 5 Drawing Sheets

U.S. PATENT DOCUMENTS

| | | | |
|---|---|---|---|
| 5,867,102 | A | 2/1999 | Souder et al. |
| 6,040,539 | A | 3/2000 | Hiegel |
| 6,082,535 | A | 7/2000 | Mitchell |
| 6,117,526 | A | 9/2000 | Marks |
| 6,201,867 | B1 | 3/2001 | Koike |
| 6,228,451 | B1 | 5/2001 | Boudouris et al. |
| 6,273,252 | B1 | 8/2001 | Mitchell |
| 6,312,124 | B1 | 11/2001 | Desormeaux |
| 6,385,164 | B1 | 5/2002 | Winicki |
| 6,471,056 | B1 | 10/2002 | Tzeng |
| 6,504,928 | B1 | 1/2003 | Toyooka |
| 6,512,834 | B1 | 1/2003 | Banter et al. |
| 6,514,660 | B1 | 2/2003 | Majumdar et al. |
| 6,524,675 | B1* | 2/2003 | Mikami et al. ............... 428/40.1 |
| 6,543,893 | B2 | 4/2003 | Desormeaux |
| 6,636,606 | B1 | 10/2003 | Lissner et al. |
| 6,646,864 | B2 | 11/2003 | Richardson |
| 6,670,015 | B1 | 12/2003 | Hanson |
| 6,705,787 | B2 | 3/2004 | Jeffries et al. |
| 6,790,396 | B2 | 9/2004 | Eiden et al. |
| 6,975,888 | B2 | 12/2005 | Buesseler et al. |
| 6,977,023 | B2 | 12/2005 | Abrams |
| 6,995,976 | B2 | 2/2006 | Richardson |
| D522,064 | S | 5/2006 | Trigg et al. |
| D522,066 | S | 5/2006 | Trigg et al. |
| D523,090 | S | 6/2006 | Trigg et al. |
| 7,070,837 | B2 | 7/2006 | Ross |
| 7,206,618 | B2 | 4/2007 | Latto et al. |
| 7,529,364 | B2 | 5/2009 | Buehler |
| 7,629,052 | B2 | 12/2009 | Brumwell |
| 2002/0100387 | A1 | 8/2002 | Churchwell |
| 2002/0178643 | A1 | 12/2002 | Brodeur |
| 2003/0002910 | A1 | 1/2003 | Jeffries et al. |
| 2003/0017848 | A1 | 1/2003 | Engstrom et al. |
| 2003/0077442 | A1 | 4/2003 | Inokuchi et al. |
| 2003/0091777 | A1 | 5/2003 | Jones et al. |
| 2005/0022924 | A1 | 2/2005 | Blackburn |
| 2005/0116334 | A1 | 6/2005 | Buehler |
| 2005/0271847 | A1 | 12/2005 | Antonini |
| 2005/0271864 | A1 | 12/2005 | Van Driesten et al. |
| 2006/0040081 | A1 | 2/2006 | Hodsdon et al. |
| 2006/0062953 | A1 | 3/2006 | Trigg et al. |
| 2006/0110565 | A1 | 5/2006 | Tataryan et al. |
| 2006/0154029 | A1 | 7/2006 | Antonini |
| 2006/0198978 | A1 | 9/2006 | Antonini |
| 2006/0240209 | A1 | 10/2006 | Sano |
| 2007/0021068 | A1 | 1/2007 | Dewhurst |
| 2007/0065620 | A1 | 3/2007 | Nonaka |
| 2008/0233326 | A1 | 9/2008 | Hegemier et al. |
| 2008/0313552 | A1 | 12/2008 | Buehler et al. |

FOREIGN PATENT DOCUMENTS

| | | | |
|---|---|---|---|
| KR | 2002029579 | A | 4/2002 |
| WO | WO 00/08622 | A1 | 2/2000 |
| WO | WO 2004/050343 | A1 | 6/2004 |

OTHER PUBLICATIONS

4th State, *Surface Treatment*, Jun. 13, 2000, p. 1, published at http://web.archive.org/web/20000613072024/www.4thstate.com/publications/surftreatment5.htm, 4th State, Inc.

DECALGIRL.COM, *Xbox Skins—Custom Xbox Skins and Xbox Stickers for Game Consoles and Controllers*, Jun. 4, 2006, pp. 1-2, published at http://web.archive.org/web/20060604090849/www.decalgirl.com/, DecalGirl.com.

EBAY.COM, *Louis V-Style Brown PhoneSkins*, Feb. 7, 2005 (date in information disclosure statement of U.S. Appl. No. 10/993,310), pp. 1-2, published at http://cgi.ebay.com/ws/eBayISAPI.dll?ViewItem&category=20340&item=5717481303&rd=1#ebayphotohosting, eBay.com.

GBAMOD.COM, *gbaMOD Your Gameboy Has a Dream*, Jul. 22, 2002, p. 1, published at http://web.archive.org/web/20020722002709/http://gbamod.com/, gbaMOD.com.

GBAMOD.COM, *gbaSKIN Item Details*, Oct. 24, 2002, p. 1, published at http://web.archive.org/web/20021024052308/gbamod.com/itemdetails.php?itemid=8, gbaMOD.com.

GBAMOD.COM, *skin template*, Oct. 20, 2002, p. 1, published at http://web.archive.org/web/20021020124327/http://gbamod.com/download, gbaMOD.com.

GELASKINS.COM, *GelaSkins Protect your iPod with Style. Not Bulk.*, Oct. 21, 2006, p. 1, published at http://web.archive.org/web/20061021011207/http://www.gelaskins.com/, GelaSkins Inc.

Hewlett-Packard, *HP Printable Tattos*, 2004, p. 1-2, published at http://www.hp.com/music, Hewlett-Packard Development Company, L.P.

IGN BOARDS.COM, *Skins. Change Your GBA Look*, 2002, pp. 1-76, published at http://boards.ign.com/game_boy_general_board/b5011/23599865/p1, IGN Entertainment, Inc.

Imbibo, *Imbibo*, Oct. 30, 2006, p. 1, published at http://web.archive.org/web/20061030132919/http://www.imbibo.biz/Site/index.php, Imbibo, Inc.

ISTYLES.COM, *iStyles—iPod, PSP & DS Fashion Accessorites*, Oct. 23, 2006, pp. 1-2, published at http://web.archive.org/web/20061023201823/http://www.istyles.com/, iStyles Ptd. Ltd.

MYTEGO.COM, *Cell phone skins and Tego skins for your Mobile phone, cellphone, notebook, laptop, iPod, MP3 players, Xbox, PSP*, Oct. 9, 2006, p. 1, published at http://web.archive.org/web/20061009012024/http://www.mytego.com/, Imbibo, Inc.

PDA JACKET.COM, *Stylish PDA Skins*, Oct. 28, 2006, pp. 1-2, published at http://web.archive.org/web/20061028160902/http://www.pdajacket.com/, PDAJacket.com.

SCHTICKERS.COM, *Schtickers. Add Your Schtick To Your Stuff!*, Oct. 31, 2006, p. 1, published at http://web.archive.org/web/20061031105152/http://www.schtickers.com/index.html, Retrofitted Designs LLC.

Skin EFX.COM, *Skin EFX Website*, Feb. 13, 2003, pp. 1-2, published at http://web.archive.org/web/20030213112357/http://www.skinefx.com/, Skin EFX.com.

*Skins Demystified*, 2003, pp. 1-2, DecalGirl.com and Ryan Peter, LLC.

SKYNMOBILE.COM, *Laptop Skins, Laptop Covers and Fashionable Laptop Accessories by Skyn!*, Oct. 4, 2006, p. 1, published at http://web.archive.org/web/20061004043706/http://skynmobile.com/, Skyn LLC.

Xbox, *Our Metallic Electric Blue "Skin Kit". Our Most Beautiful Blue Skin . . .* , Oct. 3, 2002, p. 1, published at http://web.archive.org/web/20021003074058/www.xbox-skins.com/elecblueimage.html, XBox.

XBOX-SKINS.COM, *Metallic Series "Skin Kits"*, Oct. 13, 2002, pp. 1-2, published at http://web.archive.org/web/20021013031547/www.xbox-skins.com/content.html, Xbox-Skins.com.

XBOX-SKINS.COM, *Xbox-Skins.com Website*, Oct. 9, 2002, pp. 1, published at http://web.archive.org/web/20021009224142/http://www.xbox-skins.com/index.html, Xbox-Skins.com.

PCT; App. No. PCT/US2007/083673; International Preliminary Report on Patentability mailed May 5, 2009.

PCT; App. No. PCT/US2008/066213; International Preliminary Report on Patentability mailed Dec. 7, 2009.

USPTO; U.S. Appl. No. 11/726,960; Examiner Interview Summary Record mailed Jul. 26, 2010.

USPTO; U.S. Appl. No. 11/726,960; Examiner Interview Summary Record mailed Apr. 5, 2011.

USPTO; U.S. Appl. No. 11/726,960; Office Action mailed May 29, 2009.

USPTO; U.S. Appl. No. 11/726,960; Office Action mailed Jan. 13, 2010.

USPTO; U.S. Appl. No. 11/726,960; Office Action mailed Dec. 8, 2010.

* cited by examiner

FISHING LURES AND ADHESIVE COVERS FOR SAME

PRIORITY INFORMATION

The present application is a continuation-in-part of U.S. patent application Ser. No. 11/726,960, filed on Mar. 23, 2007, which claims benefit of priority under 35 U.S.C. §119(e) to U.S. provisional application Ser. No. 60/856,495, entitled "Fulfillment Integration" filed on Nov. 3, 2006, both of which are hereby incorporated by reference in their entireties.

TECHNICAL FIELD

Embodiments of the present invention relate to adhesive covers for various types of consumer products, such as fishing lures. In particular, some embodiments relate fishing lures having customized adhesive covers.

DESCRIPTION OF THE RELATED ART

There exist today many different types of fishing lures. It is an object of many fishers to use a fishing lure designed to attract particular types of fish. However, it can be costly or difficult to design a fishing lure that includes all of the features a particular user desires. Therefore, there is a need to be able to easily customize fishing lures to the needs or desires of a user.

In addition, it may be desirable to customize fishing lures to the tastes of a particular user other than customizations designed to attract fish. For example, it may be desirable for a user to be able to customize a lure having his or her favorite sports team logo or logo of his or her alma mater, for example.

BRIEF SUMMARY OF EMBODIMENTS OF THE INVENTION

The present invention relates to adhesive covers (a.k.a. "skins") for various types of devices, such as electronic devices and fishing lures.

According to embodiments of the present invention, adhesive covers are provided that may be customized/personalized to the tastes of the owner. Embodiments may also have a non-permanent adhesive layer on its bottom surface so that a user can easily reposition or remove the adhesive cover from a fishing lure to which it was applied. In some embodiments, a layer of an adhesive cover can be pre-treated to facilitate digital printing thereon.

In addition, embodiments of adhesive covers can be fashioned to not interfere or interfere minimally with the functionality of fishing lure.

According to one embodiment of the present invention, an adhesive cover capable of adhering to a surface of a fishing lure is provided. The adhesive cover has a top over laminate layer. A middle layer is adhered to the top layer. The middle layer can be vinyl or urethane with a design applied thereto. A bottom, non-permanent adhesive layer is adhered to the middle layer. The bottom layer can be used to adhere the adhesive cover to a fishing lure's housing in a non-permanent fashion.

According to another embodiment of the present invention, a method of producing an adhesive cover adapted to be adhered to one or more surfaces of a fishing lure is provided. The method includes corona treating a middle layer and coating the middle layer with a primer. A design is applied to the middle layer. The middle layer is also sandwiched between a top laminate layer and a bottom non-permanent adhesive layer. The adhesive cover can be contoured to cover or partially cover one or more surfaces of a fishing lure.

According to a further embodiment of the present invention, an adhesive cover is provided that includes a first mylar layer having a design applied to a side of the mylar layer. A second layer is adhered to the image side of the mylar layer. The second layer can be a vinyl or polyolefin material. A third non-permanent adhesive layer is adhered to the second layer. The third layer can be transfer tape. The cover is contoured to cover or partially cover one or more sides of a fishing lure.

According to yet another embodiment of the present invention, an adhesive cover capable of adhering to a surface of a fishing lure is provided. The adhesive cover has first, second and third layers adhered together. The first layer can be a thermoplastic urethane, the second layer can be a fabric material and the third layer can be a non-permanent adhesive tape. The adhesive cover is shaped to cover or partially cover one or more sides of a fishing lure.

In another embodiment of the present invention, a fishing lure kit includes at least one fishing lure, the at least one fishing lure having one or more sections configured to receive an adhesive cover. The kit also includes at least one adhesive cover that includes a design and is adapted to be adhered to the at least one fishing lure.

Other features and aspects of the invention will become apparent from the following detailed description, taken in conjunction with the accompanying drawings, which illustrate, by way of example, the features in accordance with various embodiments of the invention.

It should be understood that the above exemplary figures are not necessarily drawn to scale. Certain proportions thereof may be exaggerated, while others may be minimized. The figures are intended to illustrate various embodiments of the invention that can be understood and appropriately carried out by those of ordinary skill in the art.

DETAILED DESCRIPTION OF EXEMPLARY EMBODIMENTS OF THE INVENTION

Although the following description of exemplary embodiments are directed to adhesive covers for electronic devices, it is understood that the adhesive covers of the present invention may be applied to the housing of any type of device wherein customization may be desired. In one embodiment, the adhesive covers as described herein may provide protection to electronic components from water and moisture as well as bumps, scratches and the like. Further, the adhesive covers can be fashioned to not interfere or interfere minimally with the functionality of an electronic device. The adhesive covers may also be customized/personalized to the tastes of the owner. In this manner, the adhesive covering may be useful for both personalizing and protecting electronic devices, such as mobile phones, and aiding in company identification, re-branding, enterprise advertising and promotion, and special events marketing.

As used herein, the term "electronic device" refers to any electronic device known in the art, for example, but not limited to electronic communication devices such as mobile telephones, personal display assistants (PDAs), pagers, radios, two-way radios, CBs, satellite radios, palm-pilots, MP3 players, music, video and audio devices, including but not limited to portable music, video and audio devices, electronic organizers, remote controls for electronic devices, and the like. Other electronic devices, for example, include electronic gaming systems, computers, laptops, cameras, Global Positioning Satellite (GPS) receivers, Compact Disc (CD) players, DVD players, television recording devices, such as TiVo®, and monitors are also meant to be included within the scope of the term "electronic device."

Figure 1A:
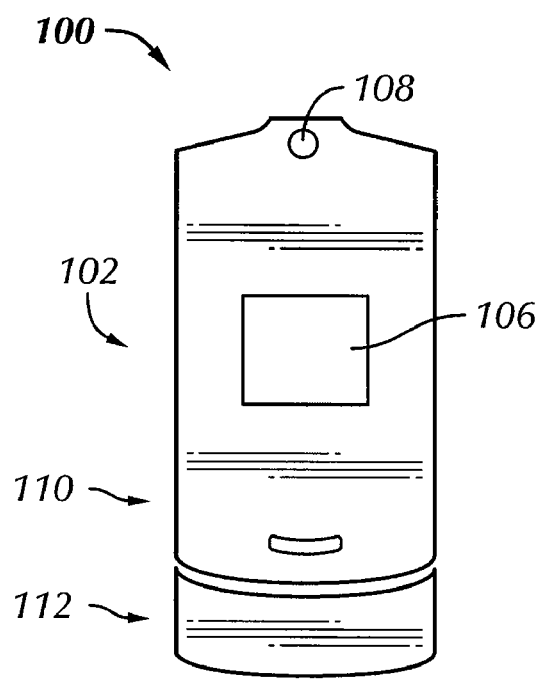
FIGS. 1A and 1B are plan views of respective front and back portions of an adhesive cover in accordance with one embodiment of the present invention.
Figure 1B:
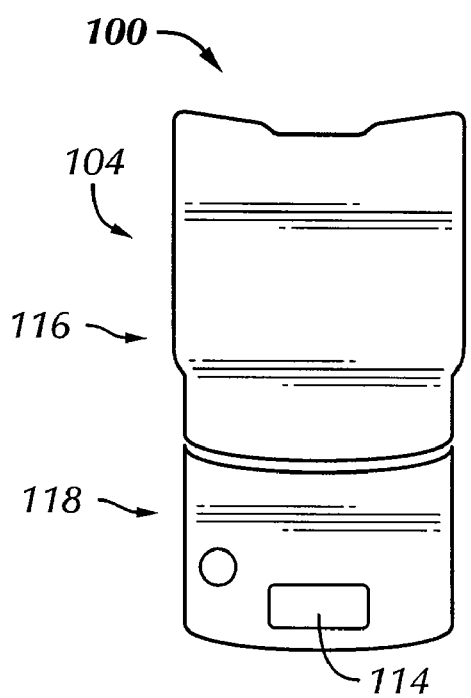

Referring now to the drawings, FIGS. 1A and 1B illustrate respective front 102 and back portions 104 of an exemplary adhesive cover 100 for mobile telephones, in accordance with one embodiment of the present invention. The adhesive cover 100 is contoured to conform to front and back sides of a mobile phone.

Figure 2:
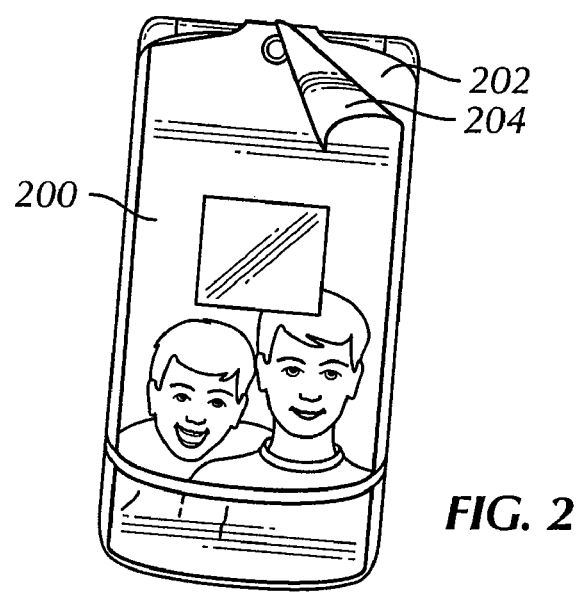
FIG. 2 shows a front view of an electronic device having an adhesive cover partially adhered thereto in accordance with one embodiment of the present invention.

FIG. 2 illustrates a further embodiment of an adhesive cover 200 adhered to a front portion of a mobile telephone 202, for example, a Motorola RAZR V3 mobile telephone. A corner 204 of the adhesive cover 200 is peeled back to illustrate a removable feature of the adhesive cover 200, in accordance with one embodiment of the present invention, and will be explained in further detail below. In addition, the embodiment 200 has a customized image formed thereon, which is also explained in further detail below.

As shown in FIGS. 1A and 1B, in one embodiment, the adhesive cover 100 is cut, shaped and sized to substantially match the surface contours of an electronic device to which it may be adhered. Furthermore, the adhesive cover does not interfere with the functionality of the electronic device. For example, the front portion 102 includes a central aperture 106 so that the cover 100 does not block the mobile phone's display screen. Similarly, a top aperture 108 can be provided so that the cover 100 does not interfere with a mobile phone's camera lens. Additionally, if the adhesive cover 100 is designed to be used with the Motorola RAZR V3 phone, for example, the front portion 102 can include two separate pieces: a top piece 110 and a bottom piece 112. The top piece 110 can substantially cover a flip-top portion of the phone and the bottom piece 112 can substantially cover a remaining surface of the front of the phone that is not part of the flip-top portion.

Shown in FIG. 1B, the back portion 104 includes a lower aperture 114 so that the adhesive cover 100 does not cover the phone's speaker. In addition, the back portion 104 comprises two separate pieces: a top piece 116 and a bottom piece 118. The two pieces 116 and 118 are separate so that a user can remove a back panel of the phone to gain access to the phone's battery. Had the back portion 104 been a single piece covering the entire back of a Motorola RAZR V3i, a user would have to either remove the back portion 104 from a phone or cut the back portion 104 prior to gaining access to or removing the back panel of the phone.

As discussed above, the adhesive cover 100 may comprise one or more pieces as well as various apertures so that it does not substantially affect the functionality of an electronic device to which the adhesive cover 100 is adhered. In other embodiments, tear away sections, peel away sections, or punch out sections may also be provided to permit parts of the electronic device to function. These parts of the electronic device can include, but are not limited to, controls, dials, buttons, displays, camera lenses, antennas, input/output jacks, microphones, speakers, signal ports (e.g. infrared signal ports), hardware connector ports, software connector ports, battery compartments and the like of the electronic device to be surrounded. Similarly, the adhesive cover 100 may also be affixed over or around one or more of the above-mentioned electronic device parts without substantially affecting the function of the parts.

The apertures, tear-away sections, peel away sections, punch out sections and the like may be created by any suitable process known in the art, for example, a die cutting process, laser cutting process, a contour cutter or any other cutting device or process that is capable of cutting a set pattern or outline for the electronic device.

Furthermore, embodiments of adhesive covers of the present invention may comprise dimensions such that the adhesive covers are capable of covering one or more sides or faces of an electronic device. For example, in some embodiments, an adhesive cover covers a portion of a single side of an electronic device. In other embodiments, an adhesive cover covers multiple sides of an electronic device. In further embodiments, an adhesive cover covers a face of an electronic device, such as a face of a mobile phone. In other embodiments, the adhesive cover can have dimensions such that it can be wrapped around one or more sides of the electronic device.

As described with reference to FIG. 2, in accordance with various embodiments of the present inventions, adhesive covers may be customized or personalized by including one or more designs. As used herein, the term "design" refers to colors, text, names, company brands, slogans, images, patterns, designs, graphics, photographs, logos, advertisements, or any combination thereof. Designs may be provided by a customer or person who wishes to customize an electronic device or may be provided by a manufacturer of the adhesive cover or other entity. Any suitable method of transferring designs to the adhesive cover may be employed, e.g. printing, screen printing, silk screening, flocking, chemically burning, etc.

Figure 3:
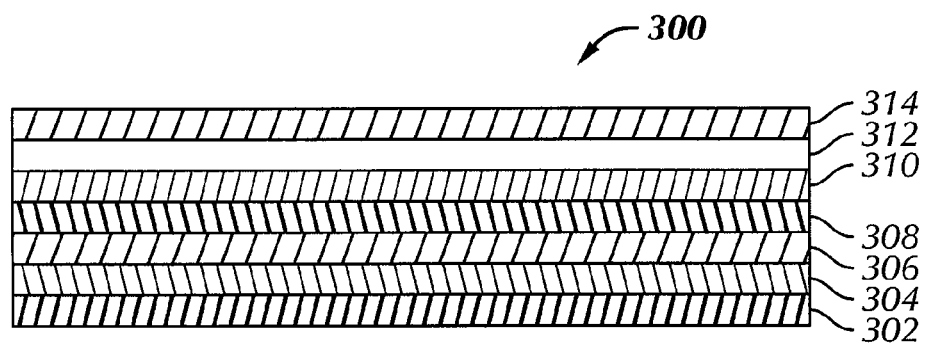
FIG. 3 illustrates a cross-sectional side view of an adhesive cover in accordance with one embodiment of the present invention.

FIG. 3 is a cross-sectional view of an adhesive cover 300 in accordance with one embodiment of the present invention. The adhesive cover 300 can comprise a number of layers: a release liner or backing strip 302, a first adhesive layer 304, a base layer 306, a primer layer 308, a print layer 310, a second adhesive layer 312 and an overlaminate layer 314.

The release liner 302 can function to cover the first adhesive layer 304 until a user decides to apply the adhesive cover 300 to a device. In other words, the release liner 302 can protect the first adhesive layer 304 from engaging surfaces or picking up dust while the adhesive cover 300 is not in use, for example. It may also be desirable to have the release liner 302 cover the first adhesive layer 304 while the adhesive layer 300 is being shipped to a user and when a user takes the adhesive cover 300 out of its packaging. A user can then pull the release liner 302 away from the remaining portion of the adhesive cover 300, thereby exposing the first adhesive layer 304. The user can then adhere the adhesive cover 300 to a device by applying the exposed adhesive layer 304 to the device.

With further reference to FIG. 3, the first adhesive layer 304 can be an adhesive material capable of adhering the adhesive cover 300 to a device. In one embodiment, the first adhesive layer 304 is chosen such that the adhesive cover 300 is non-permanent or removable from a device so that it can be repositioned after being affixed thereto. For example, the adhesive cover 300 may be peeled off a device when a user so desires. It may also be desirable that the adhesive layer 304 has a characteristic of not leaving a sticky or tacky residue on a device after a user removes the adhesive cover 300 from the device to which it was adhered. In an alternative embodiment, the first adhesive layer 304 may be permanent or essentially permanent, such that the adhesive cover 300 is non-removable or essentially non-removable from a device after being affixed thereto. In such an alternative embodiment, the adhesive cover 300 may be affixed over the top of one or more previously affixed adhesive covers.

The first adhesive layer 304 can also have a visible or invisible pattern (not shown) formed therein. The pattern can function to channel air out from underneath the adhesive cover 300 when the adhesive cover 300 is applied to a device to avoid undesirable effects of air bubbles trapped between a device and the adhesive cover 300. Suitable adhesives may be obtained from a variety of suppliers known in the art, for example, 3M and Avery Dennison. It has been found that transfer tape or pressure sensitive adhesive (a.k.a. PSA) supplied by 3M are suitable adhesives.

With further reference to FIG. 3, the base layer 306 can function as a foundation for the adhesive cover 300. The base layer 306 can also provide a desired stiffness to the adhesive cover 300. The base layer 306 can also be part of the design when, for example, the base layer 306 is of a desired color or texture. A number of different materials can be used as the base layer 306, including a PVC vinyl, a polyolefin, or other synthetic material, such as polyester, urethane, lexan and polycarbonate. Other suitable materials known in the art can also be used.

As shown in FIG. 3, the primer layer 308 can be applied to the top surface of the base layer 306. In general, the primer layer 308 can function to improve "printability" (e.g. ink absorption) of the base layer 306, thereby facilitating acceptance of the print layer 310 to the base layer 306. In one embodiment, corona treating removes impurities, such as oils and then primer is optionally applied. It has been found that a suitable primer is Digiprime 5000 supplied by Michelman Co. In other embodiments, the primer layer and/or corona treatment may be omitted.

The print layer 310 can include one or more design materials, such as ink or the like, for forming a design in the adhesive cover 300. In accordance with various embodiments, the print layer 310 can be applied to the base layer 306 (facilitated by the primer layer 308) in a variety of ways, including by digitally printing, silk-screening or screen-printing. FIG. 3 shows the print layer 310 extending across the length of the adhesive cover 300. However, it is also understood that the print layer 310 need not extend across the entire length of the adhesive cover 300, since the print layer 310 need only reside at locations where, for example, a design is present. If ink is used to print a design, various inks may be used, including glow-in-the dark ink or ultra-violet transparent ink, metal ink or other inks known in the art.

The second adhesive layer 312 can function to bond the overlaminate layer 314 to other layers of the adhesive cover 300. The second adhesive layer 312 can be either permanent or non-permanent. In addition, the second adhesive layer 312 can be transparent (i.e. clear), semi-transparent or opaque. Suitable adhesives that can be used as the second adhesive layer 312 are available from a variety of suppliers known in the art, including 3M Company located in St. Paul, Minn.

In general, the overlaminate layer 314 can provide an outside protective layer to the adhesive cover 300. In one embodiment, the overlaminate layer 314 is a calendared or cast PVC vinyl film. In another embodiment, the overlaminate layer is a polyolefin material. It has been found that a polyolefin material may be preferred over a PVC vinyl material for environmental disposal reasons, as many PVC vinyl materials are known to contain lead. Other suitable materials may also be used as are known by those skilled in the art. Furthermore, the overlaminate 314 can be transparent, semi-transparent or opaque. The overlaminate layer 314 may also be colored and have patterns formed in or on the layer 314. In one embodiment, the overlaminate layer 314 and the second adhesive layer 312 are both transparent so that the print layer 310 and/or base layer 306 are visible through the overlaminate layer 314 and the second adhesive layer 312.

A resin dome can also be applied to the adhesive cover 300. In general, a resin dome can provide a "puffy" or raised appearance to the adhesive cover. In one embodiment, the resin dome is applied on top of the overlaminate layer 314. In another embodiment, the resin dome is the overlaminate layer 314.

In one embodiment, the base layer 306 can be completely or partially transparent. Suitable materials for providing a transparent base layer 306 are well-known. In such a manner, the adhesive cover 300 can be completely or partially transparent so that, when adhered to a device, some or all of the housing of the device is visible through the adhesive cover 300. For example, in an embodiment where the base layer 300 is transparent, the print layer 310 comprises a black design and the adhesive cover 300 is applied to a device having a red colored housing, a person looking at the device would see the red housing overlaid by the black design.

It is understood that various modifications to the adhesive cover 300 may be made without departing from the spirit of the present invention. For example, additional layers may be added and some of the layers depicted in FIG. 3 may be removed. Additionally, the primer layer 308 need not be included if a printing method is used that sufficiently binds the printing layer 310 to the base layer 306 without the use of the primer layer 308. Furthermore, the printing layer 310 need not be included if, for example, it is desired not to print a design in the adhesive cover 300. Furthermore, the release liner 302 may not be needed if a manufacturer applies the adhesive cover 300 to a device soon after the adhesive cover 300 is made, for example.

Figure 4:
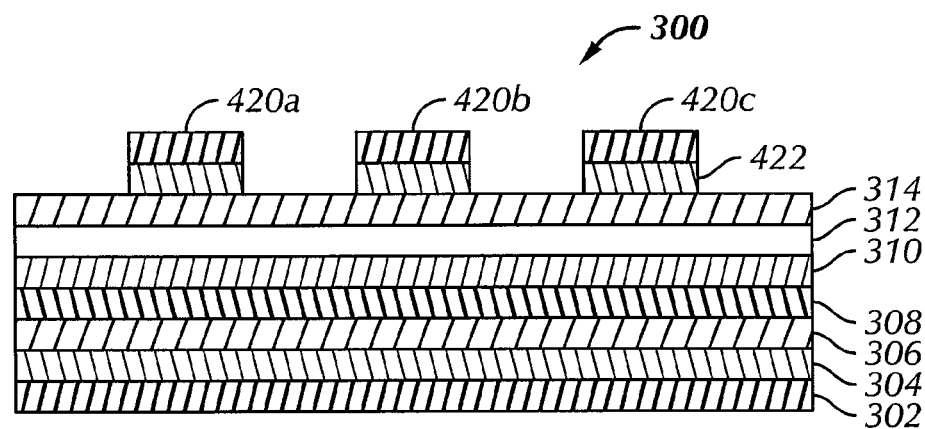
FIG. 4 illustrates a cross-sectional side view of the adhesive cover of FIG. 3 with decorative pieces applied to a top surface of the adhesive cover, in accordance with one embodiment of the present invention.
Figure 5:
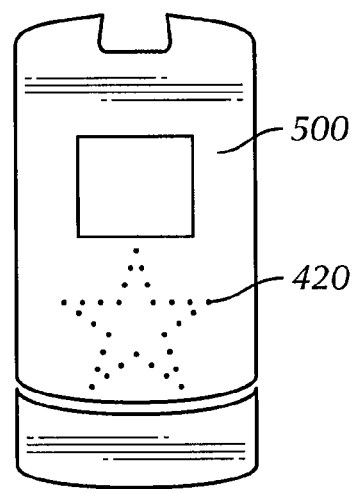
FIG. 5 is a front view of the adhesive cover of FIGS. 3 and 4 having decorative pieces arranged in a star pattern, in accordance with one embodiment of the present invention.

With reference to FIG. 4, decorative pieces 420a, 420b, 420c can be added to the adhesive cover 300 in accordance with one embodiment of the present invention. Decorative pieces 420 can be any object that attracts attention to the adhesive cover. Examples of decorative pieces 420 can include swarofsky crystals, rhinestones, beads, precious metals, plastic pieces and the like. The decorative pieces 420 can be provided in a variety of shapes and colors and can be arranged in any desired pattern, such as symbol or textual patterns. For example, FIG. 5 shows a plurality of decorative pieces 420 positioned onto an embodiment of an adhesive cover 500 in the pattern of a star.

The decorative pieces 420 can have a non-permanent or permanent adhesive layer 422 on their bottom surface so that they adhere to the surface of the adhesive cover 300. In one embodiment, the adhesive layer 422 is permanent so that the decorative pieces 420 do not come off when a user inserts a device into a pocket, for example. The decorative pieces 420 can be attached to the adhesive cover 300 during manufacturing of the adhesive cover 300, or the decorative pieces 420 can be provided to a user separately for the user to place on the adhesive cover 300 as desired. In one embodiment, the adhesive cover 300 is provided to a user with a pre-printed pattern (not shown) designating where decorative pieces 420 are to be placed. A user may then apply decorative pieces 420 to the adhesive cover 300 in accordance with the pre-printed pattern. The pre-printed pattern can comprise, for example, a plurality of dots; each dot designating a location for a user to place a decorative piece.

Figure 6:
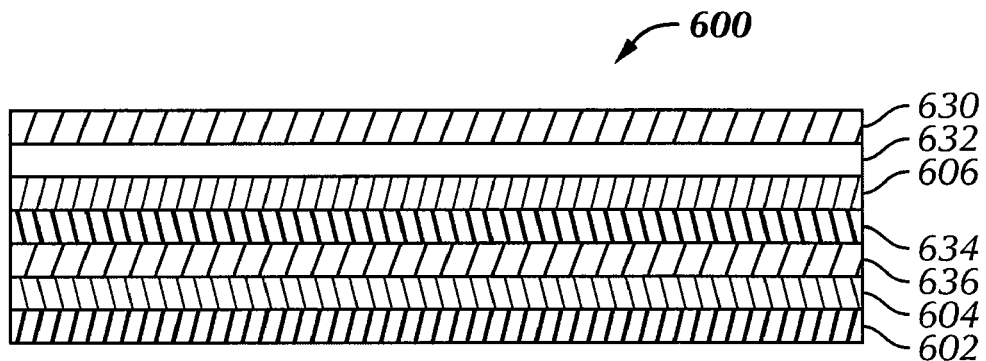
FIG. 6 illustrates a cross-sectional side view of an adhesive cover in accordance with another embodiment of the present invention.

FIG. 6 is a cross-sectional view of a further embodiment of an adhesive cover 600. The adhesive cover 600 includes an outer layer 630, which can be made of a flocked fabric or other synthetic or natural weave material. One suitable flocked fabric material is commercially available from Fiberlok, Inc. located in Fort Collins, Colo., United States, and sold under the trademark LextraMax. Alternatively, the outer layer can be a synthetic film having, for example, a wood grain, metallic, carbon or leather appearance. The outer layer 630 can also be natural panel, wood or the like.

Designs can be applied to the flock transfer material by digital printing, silk-screening and screen-printing, for example. One such screen-printing technique is described in U.S. Pat. No. 6,977,023, which issued on Dec. 20, 2005 and is entitled "SCREEN PRINTED RESIN FILM APPLIQUE OR TRANSFER MADE FROM LIQUID PLASTIC DISPERSION," the contents of which are incorporated herein by reference.

The adhesive cover 600 shown in FIG. 6 also includes a base layer 606. The base layer 606 can generally function to provide a desired stiffness or flexibility to the adhesive cover 600, prevent the adhesive cover 600 from tearing and/or maintain the overall structure of the adhesive cover 600. The base layer 606 can be, for example, made of TPU/polyurethane, mylar or other suitable synthetic or natural material that provides a desired flexibility. As shown in FIG. 6, the base layer 606 is adhered to the outer layer 630 by an adhesive layer 632, which may be a permanent or non-permanent adhesive.

Further to FIG. 6, a release liner 602 and adhesive layer 604 are adhered to a bottom side of the base layer 606. To facilitate boding, a further adhesive layer 634 and a carrier layer 636 are sandwiched between the adhesive layer 604 and the base layer 606. The carrier layer 636 preferably facilitates holding the adhesive layers 604 and 634 together. Any suitable carrier may be used, such as a polyester material, other synthetic material or other carrier known in the art.

Figure 7:
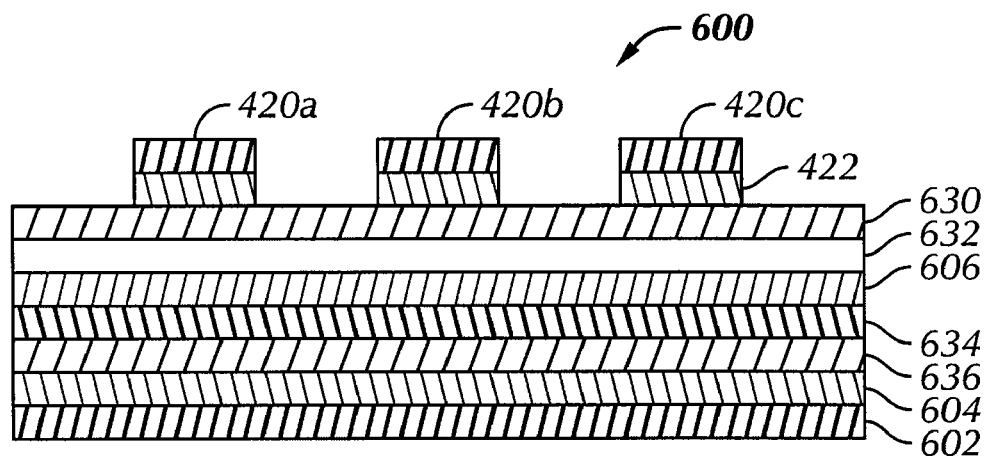
FIG. 7 illustrates a cross-sectional side view of the adhesive cover of FIG. 6 with decorative pieces applied to a top surface of the adhesive cover, in accordance with one embodiment of the present invention.

As illustrated in FIG. 7, decorative pieces 420a, 420b and 420c can also be applied to the adhesive cover 600 in a similar fashion as that described above with reference to FIGS. 4 and 5.

Figure 8:
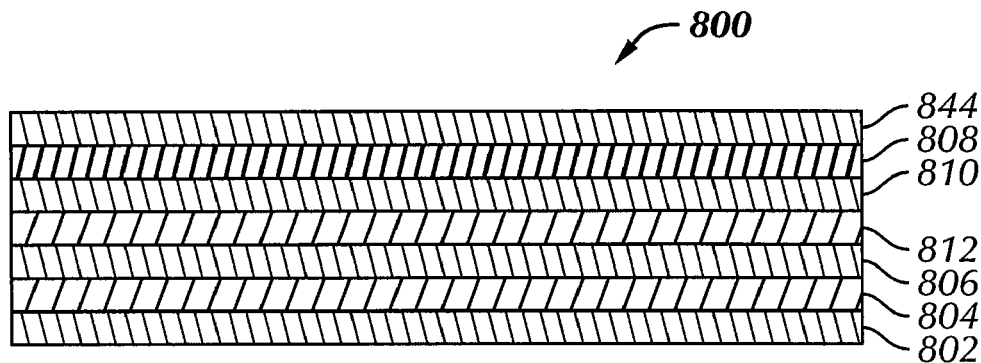
FIG. 8 illustrates a cross-sectional side view of an adhesive cover in accordance with a further embodiment of the present invention.

A cross-sectional view of an additional embodiment of an adhesive cover 800 is illustrated in FIG. 8. The adhesive cover 800 has a release liner 802, an adhesive layer 804 and a base layer 806, which can be the same as the release liner 302, the adhesive layer 304 and the base layer 306, respectively, shown in FIG. 3.

With further reference to FIG. 8, an outer layer 844 is located on a top surface of the adhesive cover 800. The outer layer 844 can be a colored or clear film made of, for example, lenticular, polyester, polycarbonate or other synthetic material. In the embodiment 800, the outer layer 844 can have a design affixed to its inner surface, as described in more detail below.

A primer layer 810 is applied to an underside of the outer layer 844. In one embodiment, the outer layer 844 is made of a lenticular material and a lenticular pattern is printed to the bottom surface of the outer layer 844. The primer layer can be the same as the primer layer 308, described with reference to FIG. 3. In an alternative embodiment, the primer layer 808 is omitted.

As shown in FIG. 8, a print layer 810 and an adhesive layer 812 are sandwiched between the primer layer 808 and the base layer 806. The print layer 810 can be applied to the underside of the outer layer 844 (via the primer layer 808) by digital printing, silkscreen, solvent ink, foil stamp or other printing method known in the art. The adhesive layer 812 can be the same as adhesive layer 312 described with reference to FIG. 3.

The following disclosure describes several specific non-limiting examples of adhesive covers and processes for making adhesive covers in accordance with embodiments of the present invention.

Figure 9:
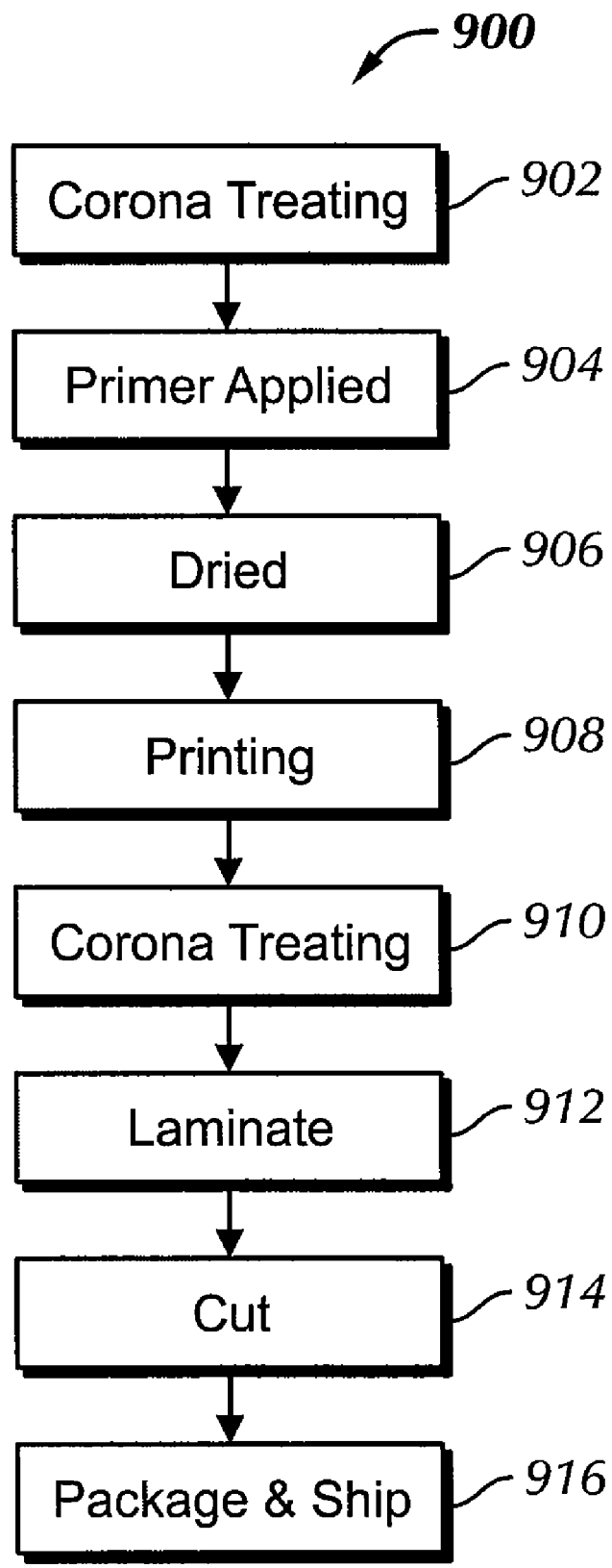
FIG. 9 is a flowchart illustrating a process for manufacturing an adhesive cover in accordance with one embodiment of the present invention.

One exemplary process 900 for manufacturing the adhesive cover 300 is illustrated in the flowchart of FIG. 9. The process 900 starts with obtaining a desired base layer 306. In one embodiment, the base layer 306 is obtained from a supplier with the adhesive layer 304 and release liner 302 already adhered to the base layer 306. At a step 902, the base layer 306 is corona treated. Corona treatment can improve the dyne level of the base layer 306 surfaces and consequently the adhesion of inks to the base layer 306 surface. In other words, corona treatment can improve "printability" (e.g. ink absorption) of the base layer 306. Next, at step 904, the base layer 306 is coated with a primer, such as Digiprime 5000 primer commercially available from Michelman Co. The base layer 306 is then hot air dried at step 906. Once sufficiently dry, a digital printer applies a desired design to the base layer 306 at step 908. The digital printer can use a four color process in conjunction with, for example, two additional spot colors. Printing can also be performed via a blanket transfer. Any suitable digital printer may be used, for example the Hewlett Packard Indigo ws 4050 Digital Press. A print speed in the range of 1 to 150 ft/min, preferably 50 ft/min may be used. The print area can be 12.1 inches by 17.1 inches with a web of 12 to 13 inches. The base layer 306 can be corona treated once again at step 910 and then cold laminated with the top layer 302 at step 912 using in-line or off-line digital converting equipment. The lamination step 912 may be performed by Veritcut System supplied by Rotoflex International.

The adhesive cover 300 can then be cut to its desired shape, which can be done by knife cut, rotary die cut or laser cut, at step 514. An i-XE10 supplied by i-cut of Lake Geneva, Wis., may be desirable for adhesive covers having a customized shape. The i-XE10 can access a pre-populated data file containing information relating to the shape to which the adhesive cover is to be cut. Alternatively, a Vericut System may be used for rotary die cutting, slitting, sheeting, counting and stacking. Rotary die cutting may be desirable for cutting large quantities of similarly shaped adhesive cover shapes.

The adhesive cover is packaged and shipped at step 516.

Decorative pieces 402 can also be applied to the adhesive cover during the manufacturing process 900 or provided to a user separately.

Figure 10:
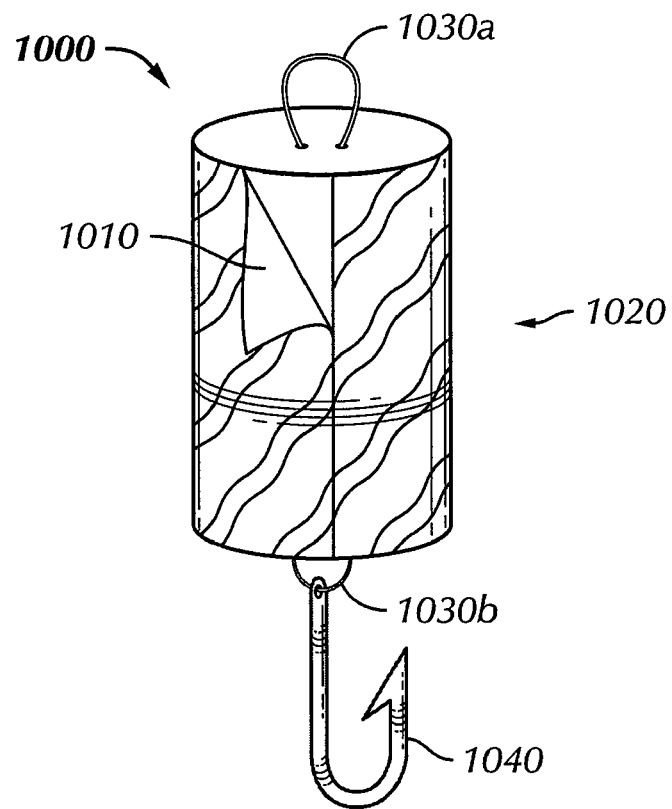
FIG. 10 illustrates a fishing lure having an adhesive cover, in accordance with one embodiment of the present invention.

Embodiments of adhesive covers can also be used with fishing equipment, for example fishing lures. In general, most fishing lure designs that have a surface area capable of receiving an adhesive cover can be used in accordance with various embodiments. FIG. 10 illustrates an exemplary embodiment of a fishing lure 1000 having an adhesive cover 1010 adhered thereto. The fishing lure 1000 includes a generally cylindrical body 1020 with a pair of eyelets 1030*a* and 1030*b* secured to opposite ends of the body 1020. The eyelet 1030*a* is configured for attachment to a line, and a hook 1040 is secured to eyelet 1030*b*.

With further reference to FIG. 10, the adhesive cover 1010 can be contoured to wrap completely or partially around the cylindrical body 1020. A portion of the adhesive cover 1010 is peeled away to illustrate a removable feature of the adhesive cover 1010. The adhesive cover 1010 can be any of the adhesive covers 300, 600 or 800 described above and manufactured according to the process 900, for example. Accordingly, similar to the other types of devices described above, the fishing lure 1000 can be customizable with various designs and decorative pieces, such as decorative pieces 402. In accordance with various embodiments, it may be desirable to customize the design to attract a particular type of fish. Persons knowledgeable about particular fish understand that a fish may be attracted to certain colors and/or design patterns and the design on the adhesive cover 1000 can be fashioned accordingly. As an example, a design can include colors and patterns that are typically present on the type of food that the fish eat or an image of the food that the fish eat. The adhesive cover 1010 illustrated in FIG. 10 includes a plurality of stripes, which may be brightly colored to attract a particular type of fish, for example. Decorative pieces 402 having shiny characteristics that can attract fish can also be applied to the adhesive cover 1010 (not shown in FIG. 10). The design of the adhesive cover 1010 can additionally, or alternatively, include a company logo, athletic team logo, scholastic logo, or any other type of designed mentioned above.

Furthermore, the adhesive cover 1010 can be removable, so that a user can remove the adhesive cover 1010 and apply a new adhesive cover. This can be advantageous because a user need not replace the lure 1000 when it desired to use a lure with a different design or if the design on the lure needs to be replaced due to wear and tear, for example. Instead, the user can easily apply a new adhesive cover on the lure 1000.

Figure 11:
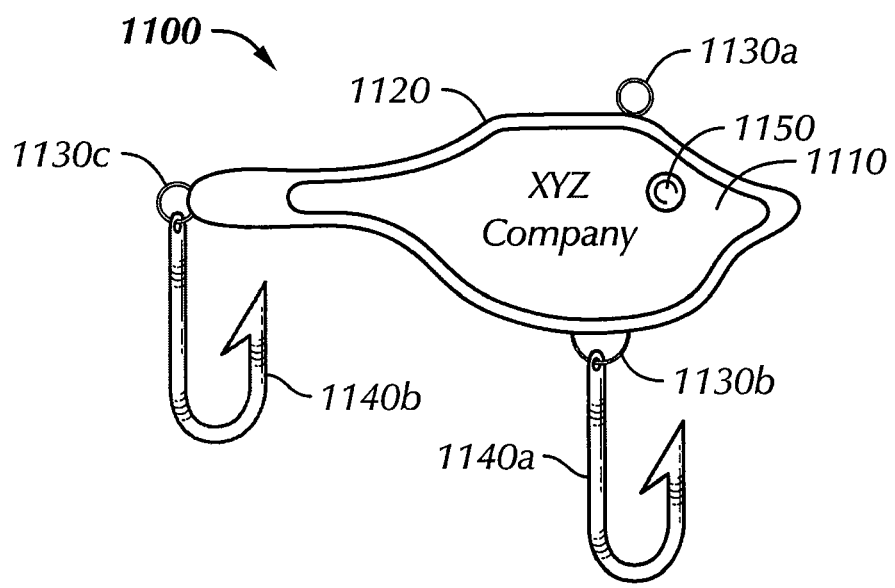
FIG. 11 illustrates another a fishing lure having an adhesive cover, in accordance with one embodiment of the present invention.

Another embodiment of a fishing lure 1100 having an adhesive cover 1110 adhered thereto is illustrated in FIG. 11. A body 1120 of the fishing lure 1100 has a shape similar to a fish. Eyelets 1130*a*, 1130*b* and 1130*c* are attached to the body 1120 and configured to attach to a line (not shown), first hook 1140*a* and second hook 1140*b*, respectively. The adhesive cover 1110 can be the same as the adhesive cover 1010 described with reference to FIG. 10, and can be adhered to a front side the body 1120 of the lure 1100. As illustrated, the adhesive cover 1110 includes a company logo design and is sized and shaped to fit on a front side of the body 1120. In addition to the front side of the body 1120, the adhesive cover 1110 can be contoured to cover portions of other sides of the body 1120, such as a back side (not shown). To do so, the adhesive cover 1110 can be either multiple separate pieces or a single piece that wraps around the lure 1100. The adhesive cover 1120 can also include apertures, tear away sections, punch out sections and peel away sections configured to not cover portions of the lure 1100. For example, the adhesive cover 1110 includes an aperture 1150 configured to expose a simulated fish eye of the lure 1100.

Although the lures described above may have particular advantages, as is understood, the present invention is not limited to any particular lure. Instead, any lure can be used that has a section capable of accepting an adhesive cover.

Lure kits can also be provided in accordance with various embodiments. A lure kit can include one or more lures of the same type or varying type, such as lures 1000 and 1100, and one or more adhesive covers, such as adhesive covers 1010 and 1100. In one exemplary embodiment, a lure kit includes twelve lures and twelve adhesive covers. Each lure in the kit can be of a different size and arranged by size in two rows in descending order. In addition, the adhesive covers can all have the same or substantially similar design and be of the same type of material, or one or more of the adhesive covers in the kit can have different designs and be of different materials. In various embodiments, a buyer of such a kit can personalize the kit by specifying the designs on the adhesive covers. As discussed above, a user can select designs believed to attract particular types of fish, include personalized logos and/or other designs, for example.

While various embodiments of the present invention have been described above, it should be understood that they have been presented by way of example only, and not of limitation. Thus, the breadth and scope of the present invention should not be limited by any of the above-described exemplary embodiments. Additionally, the invention is described above in terms of various exemplary embodiments and implementations. It should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration. Indeed, alternative functional, logical or physical partitioning can be implemented to achieve the desired features and functionality of the present invention. For example, one or more of the layers of the illustrated adhesive cover embodiments may be omitted or modified without departing from the scope of the present invention. As an additional example, with regard to flow diagrams and their accompanying description, the order in which steps may be set forth shall not be interpreted as requiring that the operations take place in that particular order unless the context dictates otherwise.

We claim:
1. An adhesive cover adhered to a fishing lure, comprising:
a base layer comprising vinyl or polyolefin;
a primer layer applied to a surface of the base layer;
a print layer applied to the primer layer, wherein the print layer comprises a design, wherein the primer layer facilitates adhesion of the print layer to the base layer;

a top layer comprising an over laminate and applied over the print layer;

the fishing lure having a surface; and a bottom layer adhered to the base layer and the surface of the fishing lure, wherein the print layer is corona treated.

2. The adhesive cover of claim 1, wherein the base layer is corona treated.

3. The adhesive cover of claim 1, wherein the print layer is applied to the primer layer by a digital printer.

4. The adhesive cover of claim 1, wherein the print layer is applied to the primer layer by a silk screen.

5. The adhesive cover of claim 1, wherein the print layer comprises an ink selected from a group consisting of a metal ink and a glow-in-the-dark ink.

6. The adhesive cover of claim 1, wherein the print layer is applied to the primer layer by etching.

7. The adhesive cover of claim 1, wherein the print layer is applied to the primer layer by chemically burning the design into the primer layer.

8. The adhesive cover of claim 1, wherein the cover has a shape that facilitates adhering the cover to the surface of the fishing lure.

9. The adhesive cover of claim 1, wherein the cover comprises one or more apertures, tear away sections, punch out sections, peel away sections or a combination thereof.

10. The adhesive cover of claim 1, wherein the design comprises one or more customized colors, text, names, company brands, slogans, patterns, images, graphics, photographs, logos, advertisements, or a combination thereof.

11. The adhesive cover of claim 1, further comprising one or more decorative pieces affixed to an outer surface of the cover.

12. The adhesive cover of claim 1, further comprising a pre-printed pattern adapted to facilitate placement of decorative pieces on the cover.

13. The adhesive cover of claim 12, wherein the pre-printed pattern comprises a plurality of dots, each dot indicating a location for a user to place a decorative piece.

14. The adhesive cover of claim 1, wherein the bottom layer has a pattern configured to channel air out from underneath the adhesive cover when the adhesive cover is applied to the fishing lure.

15. A fishing lure kit comprising:

at least one fishing lure, the at least one fishing lure having one or more sections configured to receive an adhesive cover; and a plurality of adhesive covers, each adhesive cover comprising:

a base layer comprising vinyl or polyolefin;

a primer layer applied to a surface of the base layer;

a print layer applied to the primer layer, wherein the print layer comprises a design, wherein the primer layer facilitates adhesion of the print layer to the base layer;

a top layer comprising an over laminate and applied over the print layer;

a bottom layer adhered to the base layer comprising an adhesive configured to adhere to a respective surface of a respective fishing lure; and a release liner applied to the adhesive of the bottom layer and configured to be released from the adhesive to allow the adhesive to adhere to the respective surface of the respective fishing lure;

wherein at least one of the plurality of adhesive covers has a different design than one or more of the plurality of adhesive covers, wherein the print layer is corona treated.

16. The fishing lure kit of claim 15, wherein the at least one fishing lure comprises a plurality of fishing lures, each fishing lure having a different size, wherein the plurality of fishing lures are arranged in the kit in order by size.

17. The fishing lure kit of claim 16, wherein the plurality of adhesive covers comprises a number of adhesive covers matching a number of the plurality of fishing lures.

18. The fishing lure kit of claim 15, wherein the design on each adhesive cover is selected to attract a particular type of fish.

19. The fishing lure kit of claim 15, further including one or more decorative pieces configured to adhere to one or more of the plurality of adhesive covers.

20. An adhesive cover adhered to a fishing lure, comprising;

the fishing lure having a surface; and an adhesive cover having a shape corresponding to the surface and non-permanently adhere to the surface of the fishing lure, the adhesive cover comprising:

a base layer comprising vinyl or polyolefin, wherein the base layer is corona treated;

a first adhesive layer adhered to the base layer and non-permanently adhered to the surface of the fishing lure;

a primer layer applied to a surface of the base layer opposite the first adhesive layer;

a print layer applied to the primer layer, wherein the print layer comprises a design comprising one or more customized colors, text, names, company brands, slogans, patterns, images, graphics, photographs, logos, advertisements, or a combination thereof, wherein the primer layer improves adhesion of the print layer to the base layer, wherein the print layer is corona treated after being applied to the primer layer;

a solid overlaminate layer; and a second adhesive layer comprising a permanent adhesive to permanently adhere the solid overlaminate layer on the print layer.

* * * * *